US012301588B2

(12) United States Patent
Thompson et al.

(10) Patent No.: US 12,301,588 B2
(45) Date of Patent: May 13, 2025

(54) CONTEXTUAL SECURITY RECOMMENDATIONS FOR OPTIMIZATION AND SECURITY BEST PRACTICES IN A DATA NETWORK SECURITY FABRIC

(71) Applicant: Fortinet, Inc., Sunnyvale, CA (US)

(72) Inventors: Jordan Edward Thompson, Vancouver (CA); Jerrod Robert Seger, Port Coquitlam (CA); Mark Derek Westerhof, Port Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 931 days.

(21) Appl. No.: 17/218,870

(22) Filed: Mar. 31, 2021

(65) Prior Publication Data
US 2021/0288977 A1 Sep. 16, 2021

Related U.S. Application Data

(63) Continuation-in-part of application No. 16/358,433, filed on Mar. 19, 2019, now Pat. No. 11,425,158.

(51) Int. Cl.
*H04L 9/40* (2022.01)
*H04L 12/66* (2006.01)
*H04L 41/22* (2022.01)
*H04L 43/06* (2022.01)

(52) U.S. Cl.
CPC .......... *H04L 63/1408* (2013.01); *H04L 12/66* (2013.01); *H04L 41/22* (2013.01); *H04L 43/06* (2013.01)

(58) Field of Classification Search
CPC .......................... H04L 63/1408; H04L 63/66
USPC ............................................................ 726/1
See application file for complete search history.

(56) References Cited

U.S. PATENT DOCUMENTS

| 9,147,086 | B1 | 9/2015 | Potlapally |
| 2015/0033340 | A1 | 1/2015 | Giokas |
| 2015/0324186 | A1 | 11/2015 | Shin |
| 2016/0301577 | A1* | 10/2016 | Lane ........................ H04L 41/18 |
| 2017/0243009 | A1 | 8/2017 | Sejpal et al. |
| 2018/0139205 | A1 | 5/2018 | Devaney et al. |
| 2018/0375892 | A1* | 12/2018 | Ganor ................. G06F 3/04847 |

* cited by examiner

*Primary Examiner* — Anthony D Brown
(74) *Attorney, Agent, or Firm* — Law Office of Dorian Cartwright; Dorian Cartwright

(57) ABSTRACT

A network gateway interrogates a plurality of network devices to collect security state data and operational state data on a periodic basis. Contextual security recommendations are generated based on the security rating report. Security actions can be taken based on the contextual security recommendations.

11 Claims, 13 Drawing Sheets

US 12,301,588 B2

CONTEXTUAL SECURITY RECOMMENDATIONS FOR OPTIMIZATION AND SECURITY BEST PRACTICES IN A DATA NETWORK SECURITY FABRIC

CROSS-REFERENCE TO RELATED APPLICATIONS

This application claims priority under 25 USC 120 as a continuation-in-part of commonly-owned U.S. application Ser. No. 16/358,433, filed Mar. 19, 2019, entitled DETERMINATION OF A SECURITY RATING OF A NETWORK ELEMENT, which is hereby incorporated by reference in its entirety.

FIELD OF THE INVENTION

The invention relates generally to computer processors, and more specifically, to providing contextual security recommendations based on periodically cached state information concerning the plurality of devices.

BACKGROUND

Network security is a burgeoning situation given the larger number of networked devices. Managing security has likewise become more complex along with a growing hierarchy of networked devices within the network topology of enterprise networks. One conventional technology derives a security rating for an enterprise network by examining the different devices and potential associated vulnerabilities.

Problematically, the resulting security report can be a long list of thousands of issues. Even a trained network administrator can become confused on how to organize remediation or recall specific steps to take for remediation of individual issues. Moreover, when navigating through a GUI (graphical user interface) to examiner different aspects of a network, expensive calls are made to the relevant network devices to retrieve operational state data, on-demand.

Therefore, what is needed is a robust technique for providing contextual recommendations based on periodically cached state information concerning a security state the plurality of devices. Furthermore, operational state data collected as a result can be leveraged for viewing without making expensive on-demand calls.

SUMMARY

These shortcomings are addressed by the present disclosure of methods, computer program products, and systems for providing contextual recommendations based on periodically cached state information concerning the plurality of devices.

In one embodiment, security data concerning network devices is analyzed to identify security recommendations. A GUI can be displayed to include the security analysis that allows navigation of a plurality of pages associated with the security analysis. Security issues can be presented in a prioritized manner. A selection of a page for navigation is received within the security analysis.

In another embodiment, contextual security recommendations derived from the security state data and corresponding to the selected page are overlaid on a display of the selected page, wherein each contextual security recommendations are co-located with a control to address one of the security recommendations. Contextual operational state data relevant to the security recommendation derived from the operational state data co-located with the security recommendation is provided. Responsive to selection of the control, a remediating security action is initiated.

Advantageously, both network performance and computer hardware performance are improved by improving network security issue identification and remediation processes.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing contextual security recommendations based on periodically cached state information concerning the plurality of devices. One of ordinary skill in the art will recognize many additional variations made possible by the succinct description of techniques below.

I. Systems for Contextual Security Recommendations (FIGS. 1-2)

Figure 1:
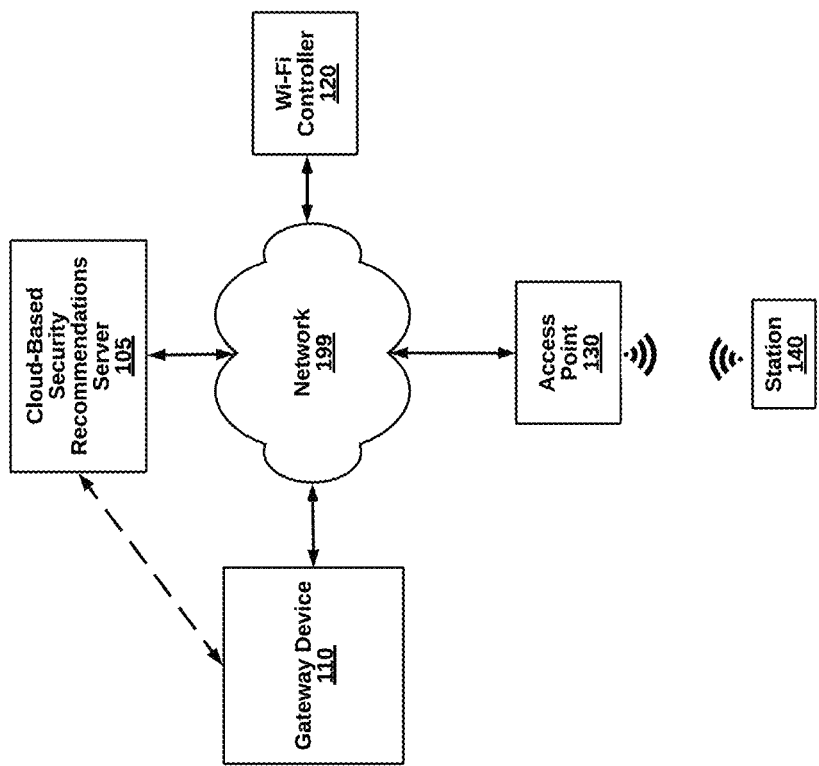
FIG. 1 is a high-level illustration of a system for providing contextual security recommendations based on periodically cached state information concerning the plurality of devices, according to an embodiment.
Figure 2:
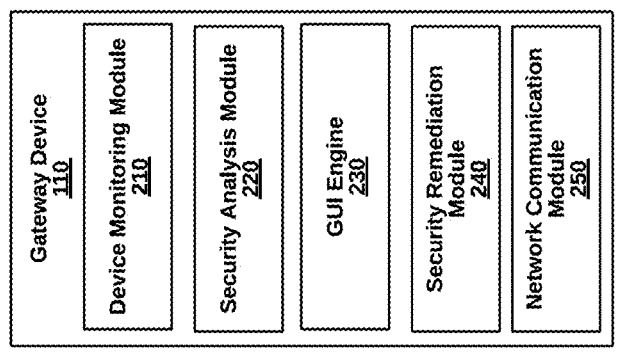
FIG. 2 is a more detailed illustration of a gateway device of the system of FIG. 1, according to an embodiment.

FIG. 1 is a high-level illustration of a system 100 for providing contextual security recommendations based on periodically cached state information concerning the plurality of devices, according to an embodiment. The system 100 includes, in part, a cloud-based security recommendations server 105, and on an enterprise network, a gateway device 110, a Wi-Fi controller 120, an access point 130 and a station 140. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the gateway device 110, the Wi-Fi controller 120 and the access point 130 are connected to the data communication system via hard wire. Other components, such as the station 140 are connected indirectly via wireless connection. The network 199 can be a data communication network such as the Internet, a WAN, a LAN, WLAN, a cellular network (e.g., 3G, 4G, 5G or 6G), or a hybrid of different types of networks. Various data protocols can dictate format for the data packets.

In one embodiment, the gateway device 110 contextualizes issues for a security data report within a GUI. The security data report can provide a security data rating as a snapshot vulnerabilities evaluation for a security fabric within an enterprise network. One example of the security data report and rating is disclosed in Ser. No. 16/358,433, entitled DETERMINATION OF A SECURITY RATING OF A NETWORK ELEMENT, which is hereby incorporated by reference in its entirety. Periodically, the network devices are interrogated for state information, including security state data and operational state data. Generally, security state data can include vulnerabilities, attack history, identified malware, configurations, policies, operating systems, network protocol software, and any other aspects for a device that affects device security and network security or vulnerabilities as a whole. The operational state data can be current network statistics such as processor and queue loads, number and type of connected devices, location on a network, type of network, network congestion and interference, user logins, and any other static or dynamic non-security information. Of course, the categories are not exclusive as some data can be considered to affect both security state and operational state.

The cloud-based security recommendations server 105 can receive the security data report and/or security rating and run the results against a database of best practices. Fixes or ways to reduce vulnerabilities can be identified and sent back to the gateway device 110. Updates can occur periodically as security issues can be dynamic in nature as viruses spread and more information is collected about what actions to take against them.

A GUI of the network device 110 can display the security data report in a dashboard to users the log on (see FIGS. 3A-3H). In one embodiment, a drill down format organizes the report by issues, by network device, chronologically, or the like. Higher priority issues that affect a security rating more can be ranked higher and shown with more emphasis. A user can make selections from the report to see, without limitation, a more detailed view of the issue, to see a specific affected device, or a certain network partition (e.g., devise of a VLAN, devices associated with the Wi-Fi controller 120 or devices associated with the access point 130). On a specific page, recommendations can be listed near controls that can be selected to automatically fix or ameliorate the issue. For example, a download link to a patch can be co-located with a vulnerability issue shown for an out-of-date operating system for the gateway device 110.

Figure 3A:
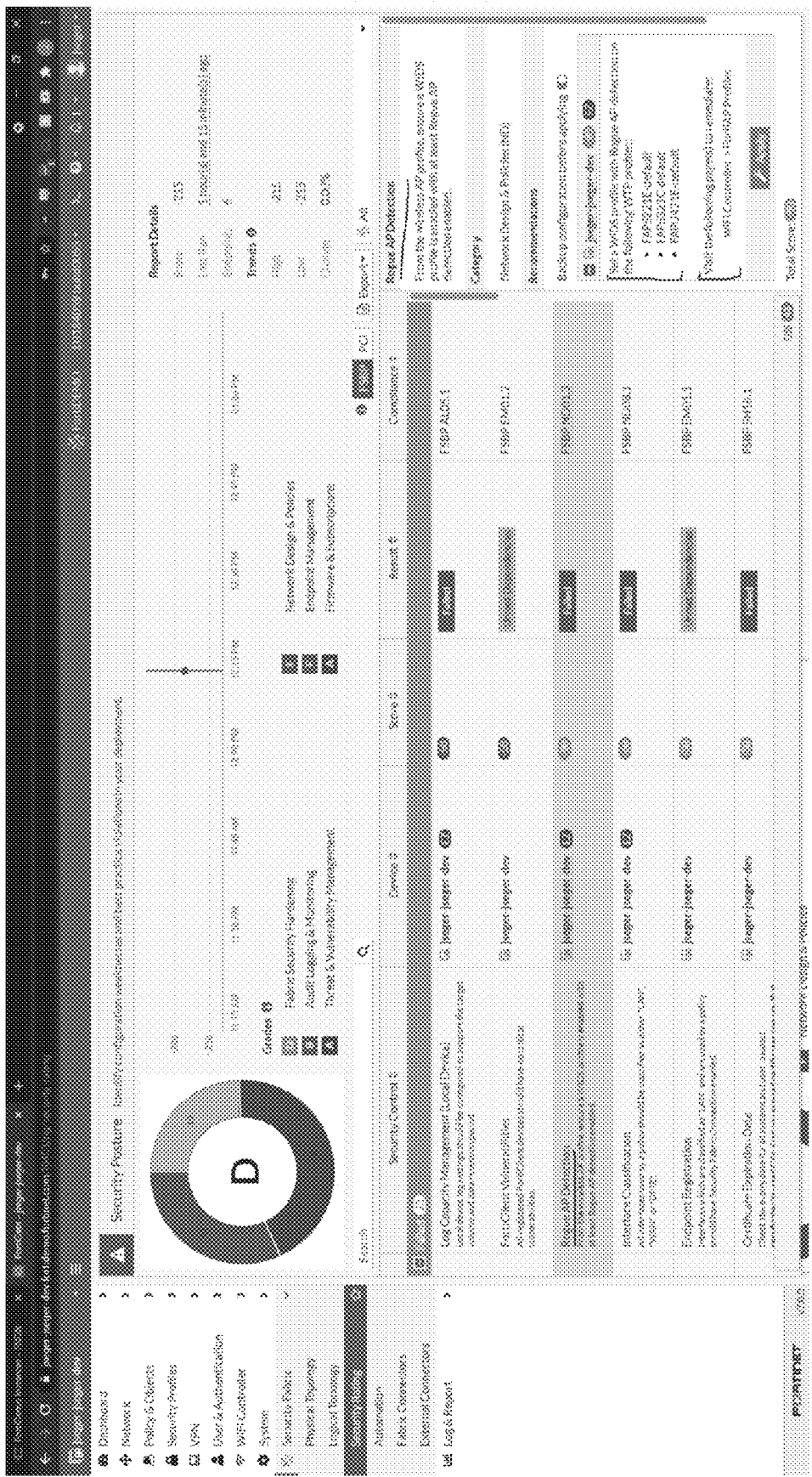
FIGS. 3A-3H are snapshots of a GUI from the system of FIG. 1, according to some embodiments.
Figure 3B:
Figure 3C:
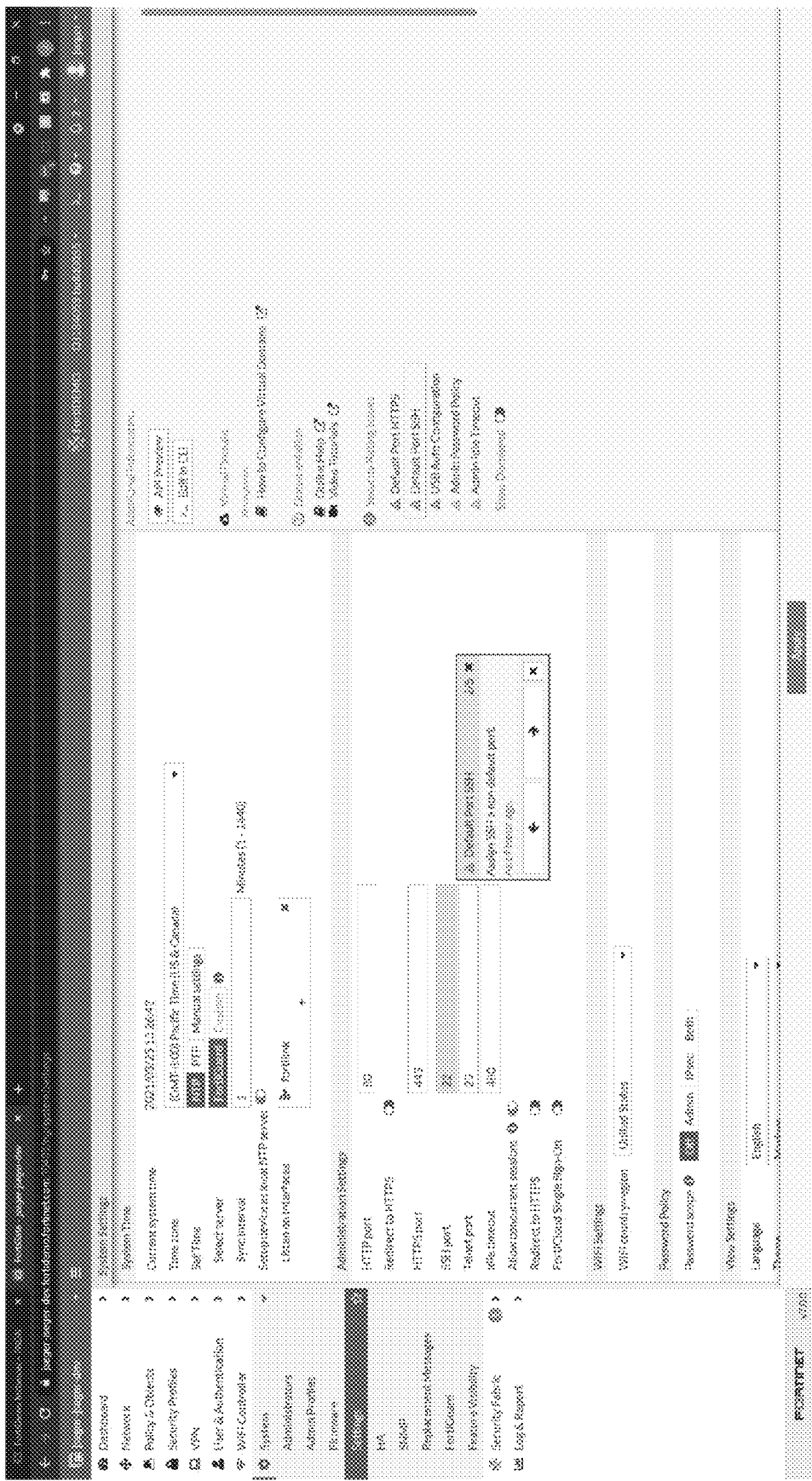
Figure 3D:
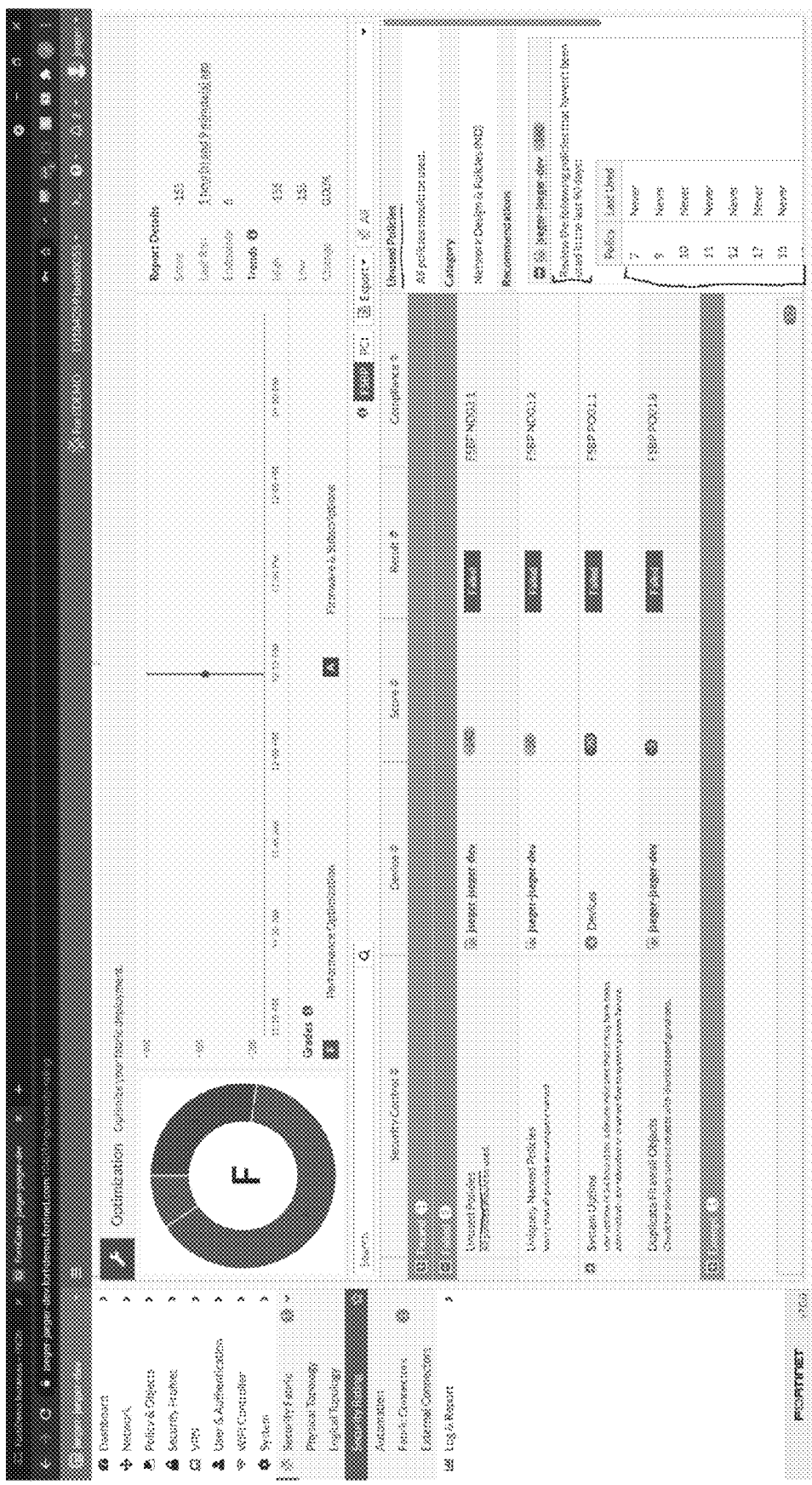
Figure 3E:
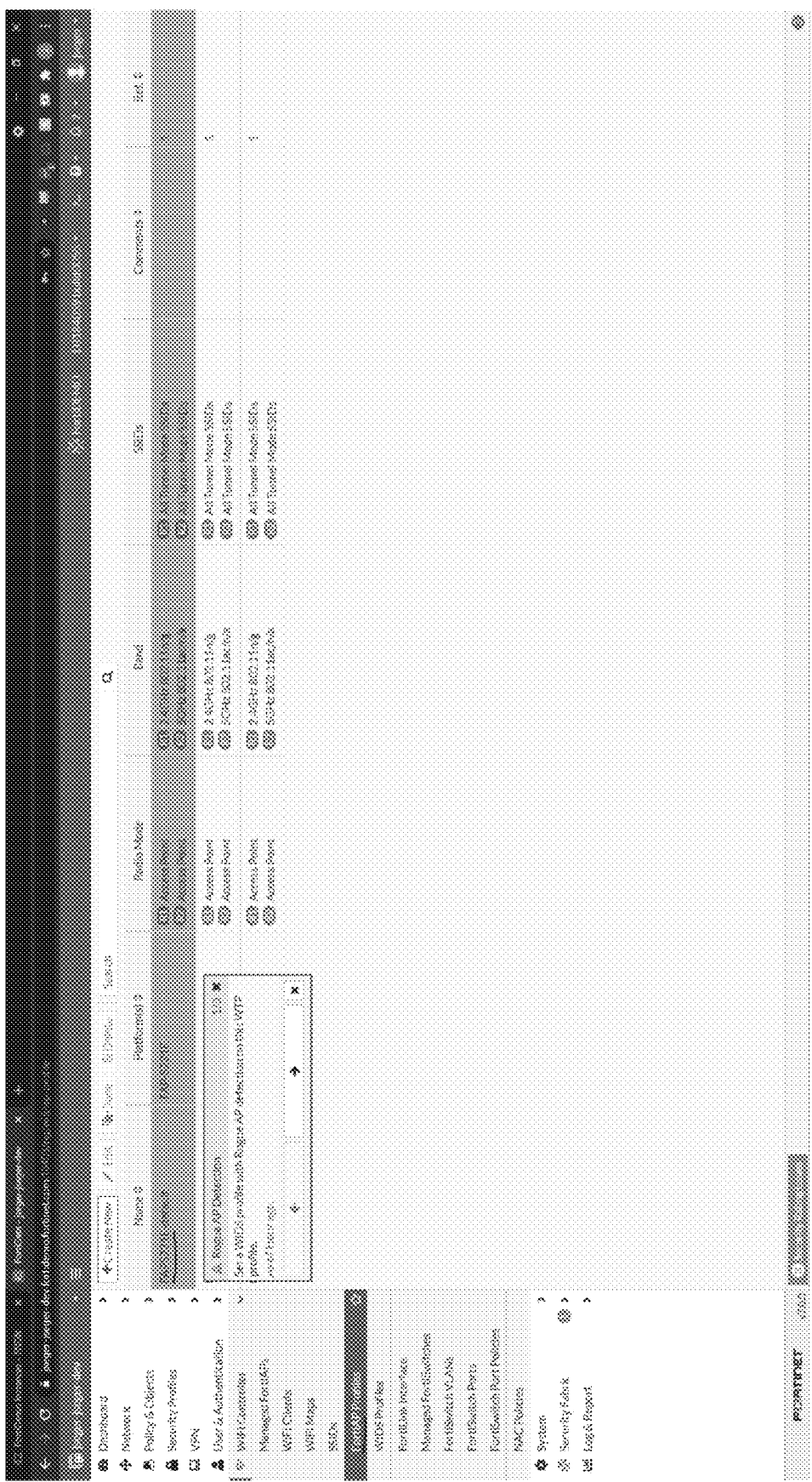
Figure 3F:
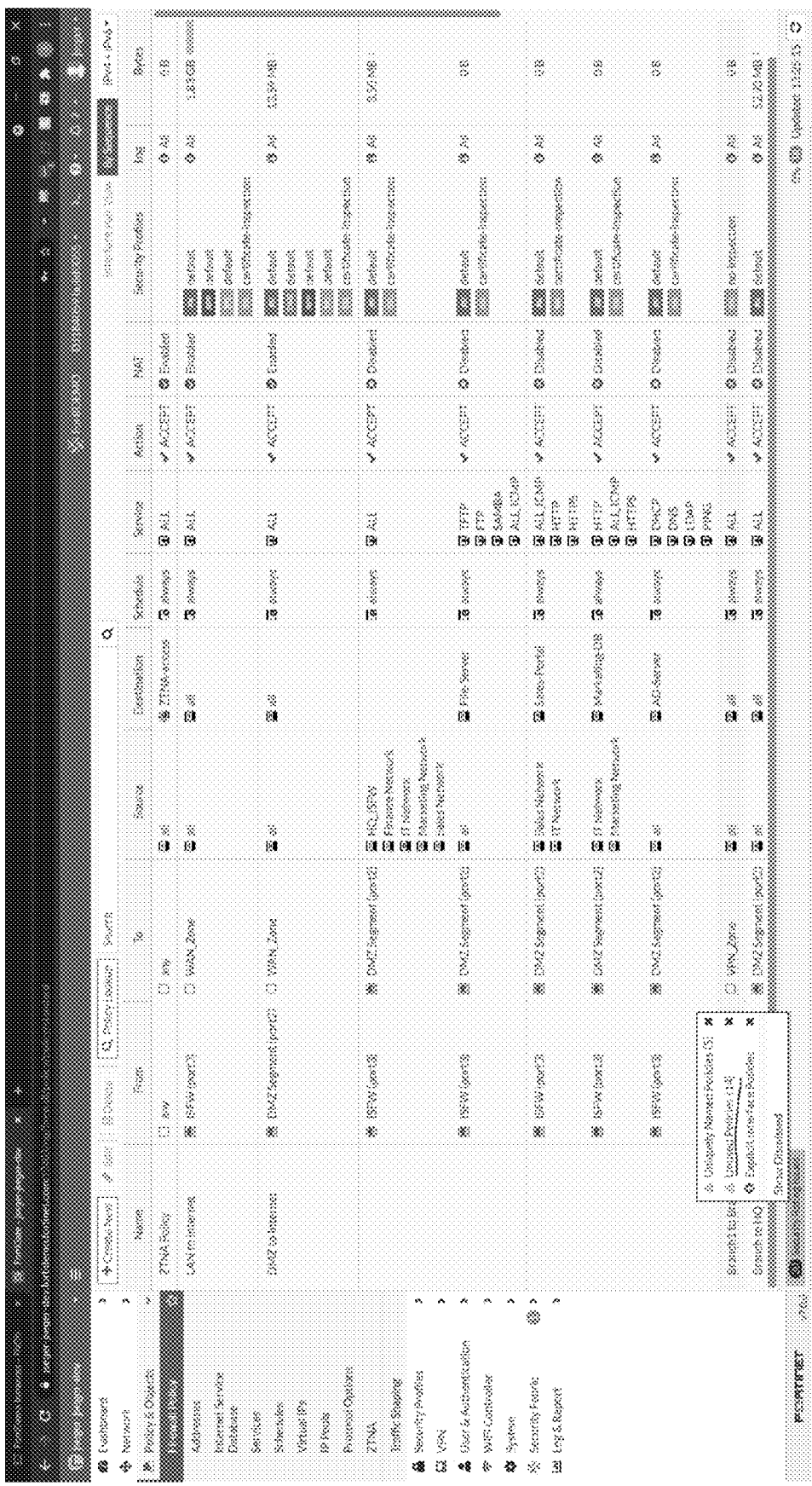
Figure 3G:
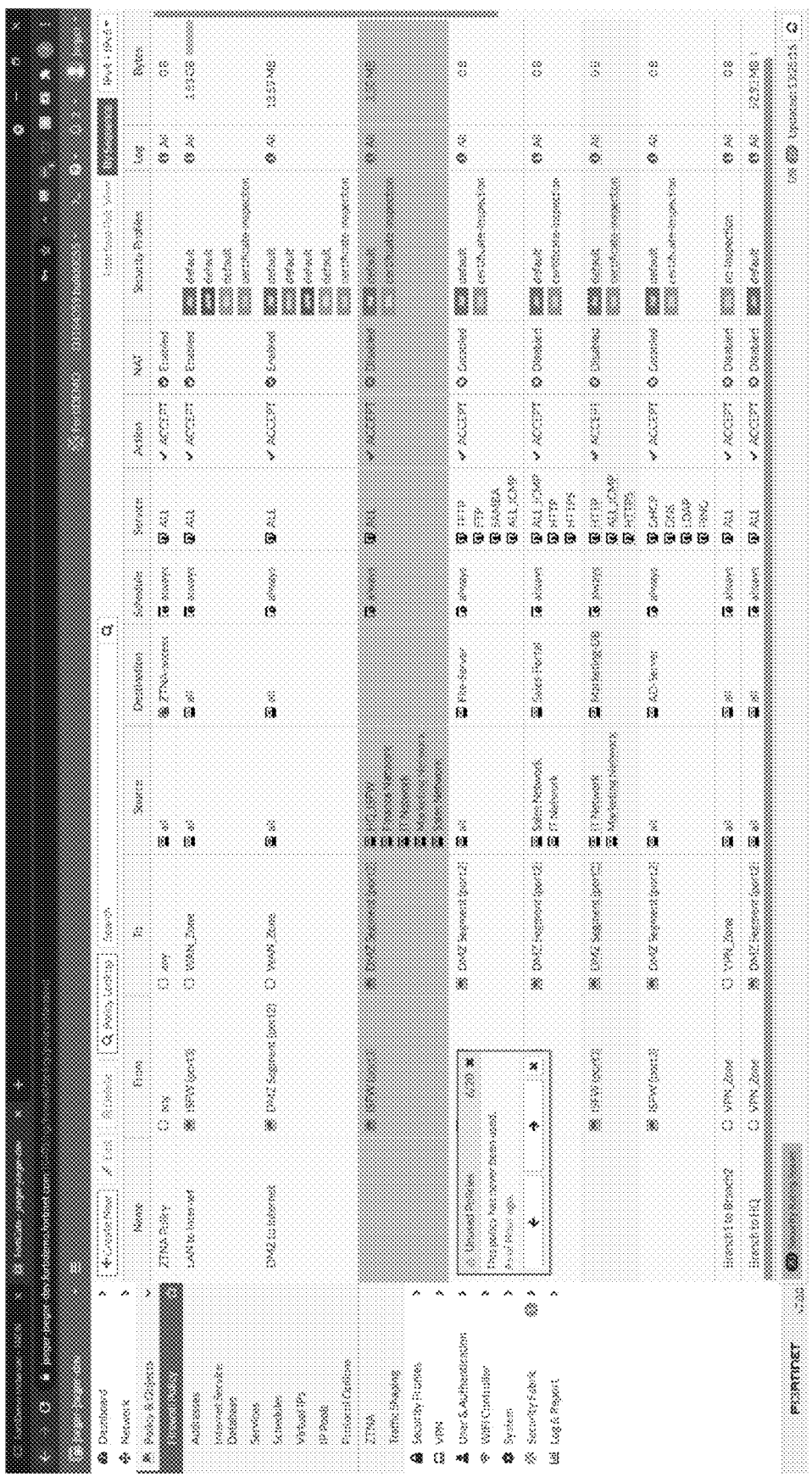
Figure 3H:

Some example screenshots of the GUI are illustrated in FIGS. 3A-3H. Specifically, FIG. 3A is viewing the Security Rating report for "Security", showing the test "Rogue AP Detection" which checks that access points have a secure configuration. The recommendation is on the right, the user is shown the spot they can solve the problem. FIG. 3B is viewing a configuration page for the FortiGate, on the right-hand side issues are highlighted from the Security Rating report. FIG. 3C shows the GUI walking the user through each issue, it highlights the relevant control on the page and steps them through the problems. FIG. 3D highlights a Security Rating test which multiple items are listed that are problematic, these items will be highlighted on their respective page. FIG. 3E shows the configuration in a list for an access point has some problem. FIG. 3F shows the policy list (FortiGate config) with 20 issues notified at the bottom, the user clicks the button and the problems are listed. FIG. 3G shows the configuration for one of the policies in the list having a problem, it is highlighted. The user can continue to view more policies with problems with the arrow functionality. Finally, FIG. 3H is the Security Rating feature, is has multiple reports for different categories (Security, Coverage, Optimization).

In another embodiment, the gateway device 110 leverages the cached state information for further assisting security remediations. Rather than using expensive calls to gather information when a specific view is accessed for a network device, the cached state data is accessed for quick updates. The state data can enhance security data as different thresholds are crossed, for example, for the number of connected stations, current number of stations using a certain operating system version, or current SSIDs in use. Many other examples are possible.

In other operations, the gateway device 110 can perform firewall duties to protect an enterprise network from external and internal threats (e.g., data packets flowing in and out and viruses running on internal devices). The security data report brings awareness to issues for monitoring. The gateway device 110 can be the FORTIgate device described below, implemented as a single device (see e.g., FIG. 6), as multiple cooperating devices, or as a virtual device. Additional embodiments of the gateway device 110 are shown below with respect to FIG. 2.

A Wi-Fi controller 120 can report self-configurations, policies, and operational state, along with data for connected peripheral devices, such as the station 130. Other peripheral devices can be upstream, downstream, or network peers (e.g., other access points). In operation, the Wi-Fi controller 120 manages the access point 120 and other devices, and in doing so, collects information and generates information from interactions.

Likewise, an access point 130 provides security and operational state information for itself and connected stations. The station 140 can be upload state information via Wi-Fi. The station 140 can be a mobile client, for instance, a smartphone, a tablet computer, or a smart appliance.

FIG. 2 is a more detailed illustration of the gateway device 110 of the system 100 of FIG. 1. The gateway device 110 includes a device monitoring module 210, a security analysis module 220, a GUI engine 230, a security remediation module 240 and a network communication module 250. The modules can be implemented in source code stored in non-transitory memory executed by a processor. Alternatively, the modules can be implemented in hardware with microcode. The modules can be singular or representative of functionality spread over multiple components.

The device monitoring module 210 interrogates the plurality of network devices to collect security state data and operational state data on a periodic basis, in an embodiment. In another embodiment, the network devices periodically push information without requests.

The security analysis module 220 analyzes the security data concerning the network devices to identify security recommendations.

The GUI engine 230 displays the GUI to include the security analysis that allows navigation of a plurality of pages associated with the security analysis. In one format, security issues are presented in a prioritized manner for user ease. When a selection of a page for navigation within the security analysis, the report is appropriately filtered. Contextual security recommendations derived from the security state data and corresponding to the selected page can be overlaid on a display of the selected page. Each contextual security recommendations are co-located with a control to address one of the security recommendations. In some implementations, the GUI engine 230 also provides contextual operational state data relevant to the security recommendation derived from the operational state data co-located with the security recommendation.

The security remediation module 240 to, responsive to selection of the control, initiate a remediating security action. Some implementations remediate automatically, while other implementations use selections from a network administrator.

The network communication module 250 may include channel communication peripherals, such as protocol software, transceivers, antenna, input/output ports, and the like.

II. Methods for Contextual Security Recommendations (FIGS. 4-5)

Figure 4:
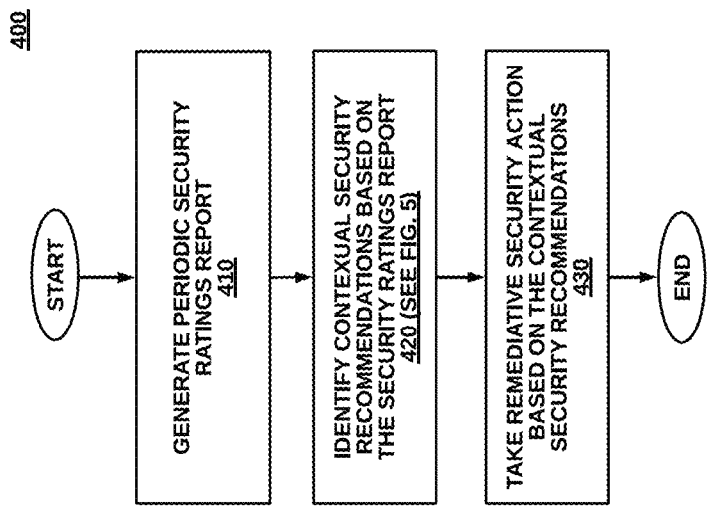
FIG. 4 is a high-level flow diagram illustrating a method for taking security action on a security rating report, according to one preferred embodiment.
Figure 5:
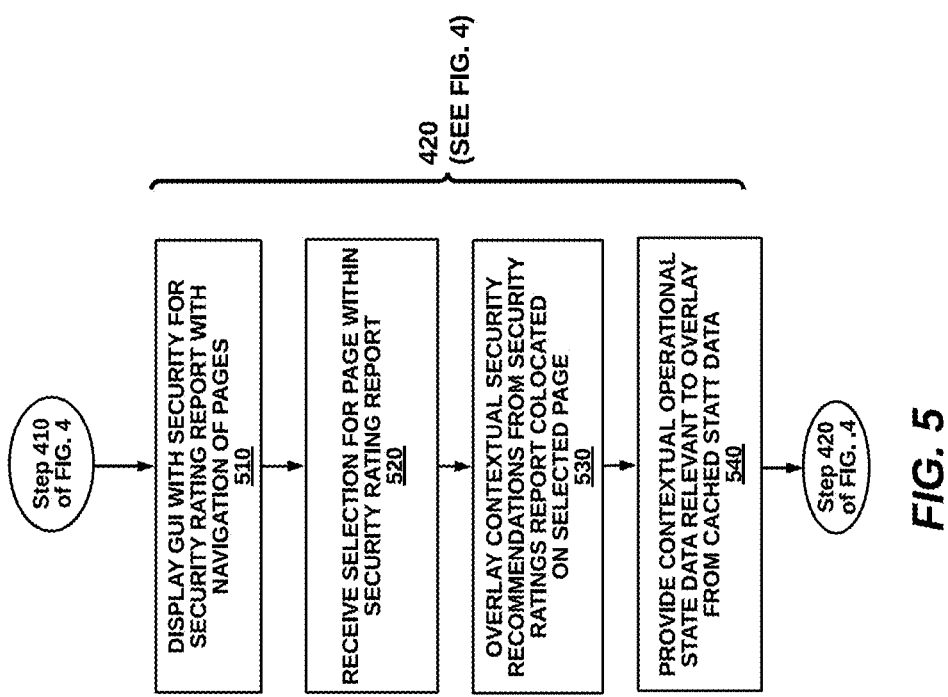
FIG. 5 is a more detailed flow diagram illustrating the step of providing contextual security recommendations based on periodically cached state information concerning the plurality of devices for the method of FIG. 4, according to one embodiment.

FIG. 4 is a high-level flow diagram illustrating a method for taking security actions on a security rating report, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a periodic security rating report is generated. To do so, one implementation interrogates the plurality of network devices to collect security state data and operational state data on a periodic basis.

At step 420, contextual security recommendations are identified based on the security rating report, as is described below in association with FIG. 5. At step 430, a security action can be taken based on the contextual security recommendations.

Returning to step 420 in more detail with reference to FIG. 5, at step 510, the GUI is displayed to include the security analysis that allows navigation of a plurality of pages associated with the security analysis. Security issues can be presented in a prioritized manner. At step 520, a selection of a page for navigation is received within the security analysis.

At step 530, contextual security recommendations derived from the security state data and corresponding to the selected page are overlaid on a display of the selected page, wherein each contextual security recommendations are co-located with a control to address one of the security recommendations. At step 540, contextual operational state data relevant to the security recommendation derived from the cached operational state data co-located with the security recommendation is provided.

Figure 6:
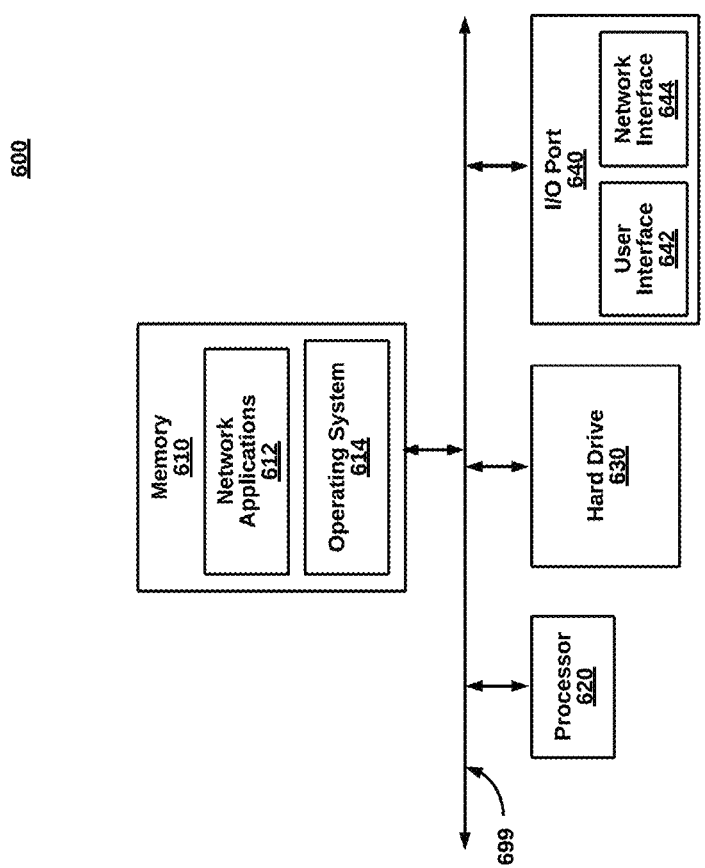
FIG. 6 is an example of a computing environment, according to an embodiment.

III. Generic Computing Device (FIG. 6)

The components of the system 100 discussed herein can be implemented by the architecture of computing environment 600, in one example. Other examples can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device can include a memory, a processor, a storage drive, and an I/O port. Each of the components is coupled for electronic communication via a bus. Communication can be digital and/or analog, and use any suitable protocol.

The memory further comprises network applications and an operating system. The network applications 612 can include a web browser, a mobile application, an application that uses networking, a remote application executing locally, a network protocol application, a network management application, a network routing application, or the like.

The operating system can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor can be single core, multiple core, or include more than one processing elements. The processor can be disposed on silicon or any other suitable material. The processor can receive and execute instructions and data stored in the memory 610 or the storage drive.

The storage drive can be any non-volatile type of storage such as a magnetic disc, EEPROM (electronically erasable programmable read-only memory), Flash, or the like. The storage drive 630 stores code and data for applications.

The I/O port further comprises a user interface 642 and a network interface. The user interface can output to a display device and receive input from, for example, a keyboard. The network interface (e.g., RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A GUI (graphical user interface) on a gateway device to an enterprise network that monitors a plurality of network devices on the enterprise network, for providing contextual recommendations based on periodically cached state information concerning the plurality of devices, the gateway device comprising:
a processor;
a network interface communicatively coupled to the processor and to the enterprise network; and
a memory, storing:
a device monitoring module to interrogate the plurality of network devices to collect security state data and operational state data on a periodic basis;
a security analysis module to analyze the security data concerning the network devices to identify security recommendations;
a GUI engine to display the GUI to include the security analysis that allows navigation of a plurality of pages associated with the security analysis, wherein security issues are presented in a prioritized manner, wherein the GUI engine receives a selection of a page for navigation within the security analysis,
wherein the GUI engine overlays contextual security recommendations derived from the security state data and corresponding to the selected page on a display of the selected page,
wherein each contextual security recommendations are co-located with a control to address one of the security recommendations and the control is co-located with the security recommendations comprises a click-to-fix link, and
wherein the GUI engine provides contextual operational state data relevant to the security recommendation derived from the operational state data co-located with the security recommendation; and
a security remediation module to, responsive to selection of the control, initiate a remediating security action.

2. The gateway device of claim 1, wherein the plurality of pages includes a page for each of different configurations of the gateway device, wherein the control co-located with the security recommendations comprises a click-to-fix link.

3. The gateway device of claim 1, wherein the plurality of pages includes a page for each of the network devices.

4. The gateway device of claim 1, wherein the plurality of pages includes a page for a partition of the enterprise network, based on a VLAN (virtual local access network).

5. The gateway device of claim 1, wherein the plurality of pages includes a page for a partition of the enterprise network, based on an SSID (service set identifier) and network devices associated with the SSID.

6. The gateway device of claim 1, wherein the plurality of pages includes a page for a partition of the enterprise network, based on a Wi-Fi controller and network devices managed by the Wi-Fi controller.

7. The gateway device of claim 1, wherein the plurality of pages includes a page for a partition of the enterprise network, based on an access point and network devices managed by the access point.

8. The gateway device of claim 1, wherein the contextual operational state recommendations are provided from cached operational state data without a new interrogation.

9. The gateway device of claim 1, wherein the security action comprises an update of a security configuration.

10. A computer-implemented method in a GUI (graphical user interface) on a gateway device to an enterprise network that monitors a plurality of network devices on the enterprise network, for providing contextual recommendations based on periodically cached state information concerning the plurality of devices), the method comprising the steps of:

interrogating the plurality of network devices to collect security state data and operational state data on a periodic basis;

analyzing the security data concerning the network devices to identify security recommendations;

displaying the GUI to include the security analysis that allows navigation of a plurality of pages associated with the security analysis, wherein security issues are presented in a prioritized manner, wherein the GUI engine receives a selection of a page for navigation within the security analysis;

overlaying contextual security recommendations derived from the security state data and corresponding to the selected page on a display of the selected page, wherein each contextual security recommendations are co-located with a control to address one of the security recommendations and the control is co-located with the security recommendations comprises a click-to-fix link;

providing contextual operational state data relevant to the security recommendation derived from the operational state data co-located with the security recommendation; and responsive to selection of the control, initiating a remediating security action.

11. A non-transitory computer-readable media in a GUI (graphical user interface) on a gateway device to an enterprise network that monitors a plurality of network devices on the enterprise network for, when executed by a processor, providing contextual recommendations based on periodically cached state information concerning the plurality of devices), the method comprising the steps of:

interrogating the plurality of network devices to collect security state data and operational state data on a periodic basis;

analyzing the security data concerning the network devices to identify security recommendations;

displaying the GUI to include the security analysis that allows navigation of a plurality of pages associated with the security analysis, wherein security issues are presented in a prioritized manner;

receiving a selection of a page for navigation within the security analysis;

overlaying contextual security recommendations derived from the security state data and corresponding to the selected page on a display of the selected page, wherein each contextual security recommendations are co-located with a control to address one of the security recommendations and the control is co-located with the security recommendations comprises a click-to-fix link;

providing contextual operational state data relevant to the security recommendation derived from the operational state data co-located with the security recommendation; and responsive to selection of the control, initiating a remediating security zero.

* * * * *